March 23, 1965  S. HANSEN  3,174,327
THERMAL GAS ANALYZER
Filed Oct. 1, 1962

INVENTOR.
SIEGFRIED HANSEN,
BY James K Haskell
ATTORNEY.

United States Patent Office 3,174,327
Patented Mar. 23, 1965

3,174,327
THERMAL GAS ANALYZER
Siegfried Hansen, Los Angeles, Calif., assignor to Hughes Aircraft Company, Culver City, Calif., a corporation of Delaware
Filed Oct. 1, 1962, Ser. No. 227,305
6 Claims. (Cl. 73—25)

This invention relates to a gas analyzer and more particularly to a thermal gas analyzer for identifying and measuring the constituents of a gas mixture.

Of the various known types of gas analyzers, one type of which this invention constitutes an improvement is based on the characteristic vapor pressure-temperature curve of any substance. In this type, a finite amount of a gas mixture is introduced into the analyzer, its temperature decreased to condense the gas mixture, and the condensed mixture thereafter vaporized by gradually increasing its temperature. These vapors surround a high temperature-resistance coefficient resistor, hereafter referred to as the detector resistor, forming an arm of a bridge circuit, the cooling effect of the vapors varying the resistance in this arm and upsetting the balanced state of the bridge. The temperatures at which vaporization takes place and the bridge becomes unbalanced serve to identify the constituents of the gas mixture. The voltages necessary to re-balance the bridge are, by means of calibration curves, converted to pressure units, which measurements further serve as a quantitative measure of the vapor present.

In such prior art gas analyzers, it was not uncommon to use a separate or reference bridge circuit for each of the various substances likely to be contained in the gas mixture. In each reference bridge circuit, the detector resistor is surrounded by one or more known gases, none of which interacts with any other. The known gases are subjected to the same temperature and pressure variations as the unknown gas mixture. To conduct an analysis, the human operator must observe and compare the balanced state of all of the bridge circuits. If several reference bridge circuits are unbalanced at the time the bridge circuit with the unknown mixture becomes unbalanced, the vaporized constituent of this mixture is thus identified as that known gas having the highest condensible temperature of the group of known gases utilized in the unbalanced reference bridges.

The obvious disadvantage of this prior art gas analyzer is the inefficient use of material and equipment and the time required and the complexity encountered in conducting an analysis. The requirement of observing the balanced state of an unlimited number of bridge circuits comprising the gas analyzer as well as controlling the temperature changes and recording the temperatures at which the bridge circuits become unbalanced unduly complicates the operator's task. If a quantitative analysis is also desired, he must quickly rebalance all unbalanced bridge circuits before too great a temperature change takes place. In addition, these prior art gas analyzers were neither reliable nor accurate at pressures below $10^{-3}$ mm. of Hg and, since the vapors once identified were not removed, small amounts of gases in the unknown mixture and especially vapors having nearly equal vapor pressure-temperature curves were difficult to detect and too frequently remained undetected.

The present invention obviates the above mentioned disadvantages. In a preferred embodiment exemplified below primarily for descriptive purposes, there is provided a thermal gas analyzer for analyzing samples of low pressure gas, the principal parts comprising a sampling valve, a delivery tube, a condenser-evaporator, a cryopump and a sensitive pressure gauge. By using a cryogenic system, the entire gas mixture is frozen on the inner wall of the condenser-evaporator and subsequently vaporized, which vapors are instantly detected and ultimately measured and thereafter removed from the gas analyzer. For accuracy, a uniform layer of the frozen mixture is required and assured by the preferred spherical geometry of the condenser-evaporator. Accurate low pressure measurements are readily obtained by any commercial ion gauge of a suitable type. By removing the vapors and controlling the rate at which the temperature increases, vapors of substances having nearly equal vapor pressure-temperature curves may be quickly detected and positively identified and quantitatively measured.

In accordance with the invention, there is provided a gas analyzer comprising in combination valve means having an inlet connectable to a source containing a gas mixture to be analyzed and an outlet through which a preselected amount of the mixture is passable, condenser-evaporator means coupled to the outlet and adapted to subject the mixture to predetermined temperature and pressure variations, and indicator means associated with the condenser-evaporator means and operatively responsive to the presence of the vapors of the mixture.

This results in an improved thermal gas analyzer which is easy to operate, relatively inexpensive to build and capable of an accurate determination both qualitatively and quantitatively of the unknown constituents of a gas mixture.

It is therefore an object of the present invention to provide an improved thermal gas analyzer of the type to be described for qualitatively and quantitatively determining the constituents of a gas mixture.

It is another object of the present invention to provide an improved thermal gas analyzer in which the entire unknown gas mixture is frozen in a uniform layer.

It is still another object of the present invention to provide an improved thermal gas analyzer having means for removing the unknown constituents of a gas mixture once they are vaporized.

It is a further object of the invention to provide an improved thermal gas analyzer capable of detecting the presence and measuring the pressure of vapors of substances having similar characteristic vapor pressure-temperature curves.

The above and other features, objects and advantages of the present invention will appear from the following description of an exemplary embodiment thereof illustrated in the accompanying drawings wherein.

Figure 1:
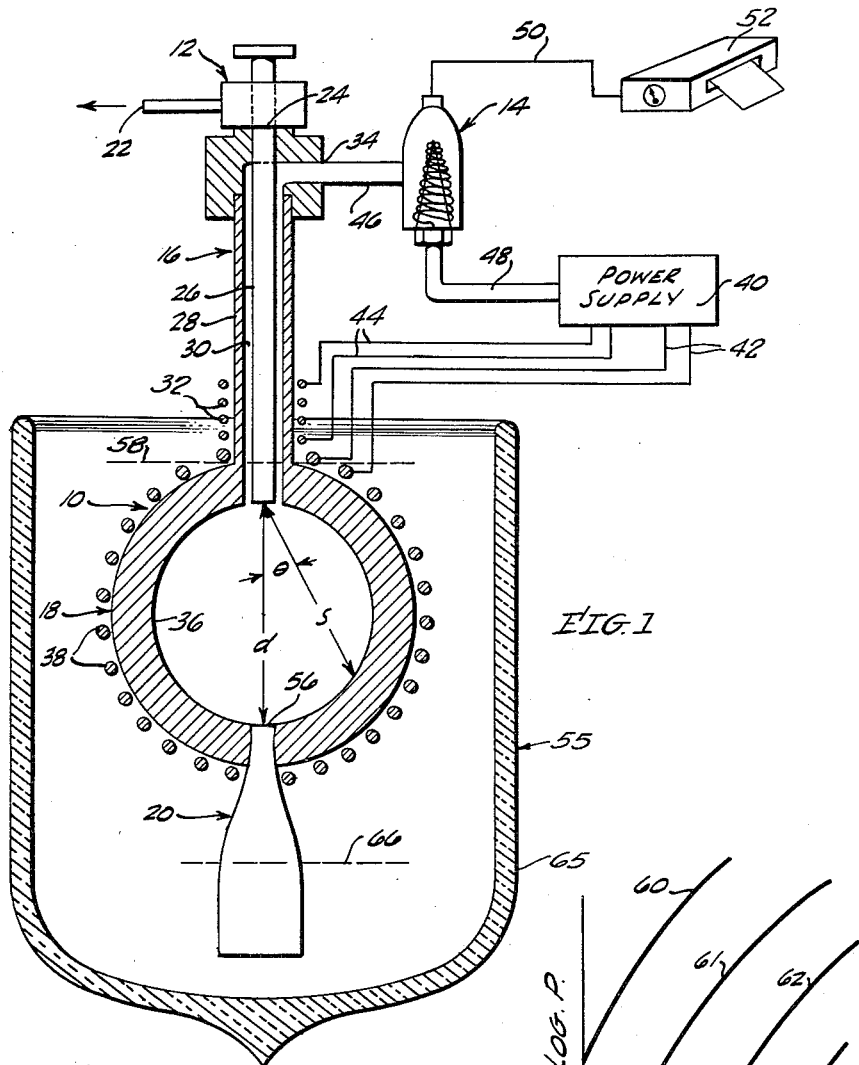
FIG. 1 is a cross sectional view showing a preferred embodiment of the thermal gas analyzer of the present invention.

Referring to FIG. 1, there is shown a thermal gas analyzer 10 comprising a valve assembly 12, an ion gauge 14, a delivery column 16, a condenser-evaporator 18, a cryopump 20 and a cryogenic system 55.

The gas under analysis is supplied to an inlet 22 of the gas analyzer 10 and a predetermined amount is delivered at an outlet 24 of the valve 12 in a conventional manner.

The delivery column 16 includes an inner delivery tube 26 and a coaxially disposed outer delivery tube 28 which tubes 26 and 28 together form an annular passage 30. The tube 26 is connected to the outlet 24 of the valve 12 and is made preferably of heavy walled copper to minimize condensation of the incoming gas in this region. Recondensation of the gas on the outer delivery tube 28 is avoided by maintaining this region at a slightly higher temperature than the condenser-evaporator 18 during the time that the condenser-evaporator is being heated. A heater winding 32 is provided for this purpose and is connected to a source of power 40 by conductors 44.

The annular passage 30 extends upwardly, as seen in FIG. 1, along the length of the delivery column 16 and forms a port 34 at its upper end adjacent to the valve assembly 12. At the lower end of the delivery column 16, as seen in FIG. 1, the tube 26 and the annular passage 30 empty into the condenser-evaporator 18 and are flush with its inner spherical surface 36.

The condenser-evaporator 18 is preferably spherical in form and is made of heavy walled copper. Surrounding the condenser-evaporator 18 is a heater winding 38, the end terminals thereof being connected to the source of power 40 by conductors 42. The heater winding 38 is designed to deliver a uniform power input per unit area so that the temperature of all areas of the condenser-evaporator 18 may be changed equally at a desired rate.

A cryopump 20 is extended from the lower portion of the evaporator-condenser 18, as seen in FIG. 1, and includes an opening 56 formed in the surface 36. As a modification, the cryopump 20 may be eliminated in which case the valve 12 is opened, during the time that the condenser-evaporator 18 is being heated, to allow the vapors to return to their original source. The removal of the vapors in this manner is satisfactory though much slower in comparison with the preferred embodiment of FIG. 1.

The ion gauge 14 is operatively connected at the port 34 by a tubulation 46 and receives power from the power source 40 through a cable 48. The output signal from the gauge 14 is delivered through a cable 50 to a recorder 52 which may include a meter 54. Various other commercially available graphic recording means may be employed a logarithmic recorder being particularly suitable since pressure peaks of widely different amplitudes are easily accommodated and readily interpreted with this type of recorder.

Figure 2:
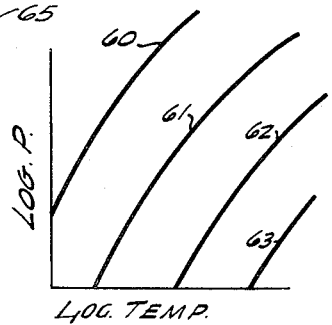
FIG. 2 shows the general shape of the characteristic logarithmic vapor pressure-temperature curves of, in this figure, four different substances.

The characteristic shape of the logarithmic vapor pressure-temperature curves is illustrated in FIG. 2, four different substances, 60, 61, 62 and 63 being shown.

Figure 3:
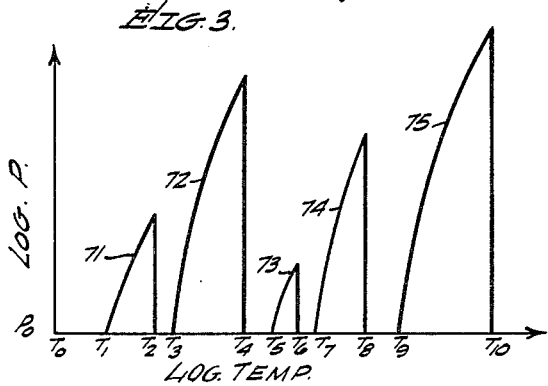
FIG. 3 is a logarithmic plot of an analysis showing graphically the relationship between temperature and vapor pressure of an unknown gas mixture having, in this case, five identifiable constituents.

In FIG. 3 an analysis of a gas mixture comprising five different substances 71 through 75 is graphically described. It should be noted that as the temperature is increased from $T_0$ to $T_1$, the substance 71 is vaporized and at temperature $T_2$ is entirely vaporized and ultimately removed from the gas mixture by the cryopump 20. At temperature $T_3$, the substance 72 begins to vaporize and likewise is completely vaporized and completely removed from the initial gas mixture at $T_4$. Similarly, the vaporization of substances 73, 74 and 75 commences at temperatures $T_5$, $T_7$ and $T_9$ respectively and subsequently is completed and ultimately removed from the gas mixture at temperatures $T_6$, $T_8$ and $T_{10}$ respectively. Each of the substances 71 through 75 is readily identifiable by the left or curved portions of the plot shown in FIG. 3.

As to the quantitative measurements, the pressure values recorded can be calibrated to indicate the portion each particular substance 71 through 75 constitutes the whole of the initial gas mixture analyzed in FIG. 3.

Under proper operating conditions, the cryopump 20 removes the vapors from the condenser-evaporator 18 at a rate such that the vapors of each substance 71 through 75 are removed prior to the subsequent evaporation of another substance having higher condensation temperature. In cases where two indications overlap, a characteristic notch in the curve will show the presence of a second component.

In the practice of this invention, the gas analyzer 10 of FIG. 1 is connected, via the sampling valve 12, to a source containing the low pressure gas to be analyzed. With the valve open, the condenser-evaporator 18 and the delivery column 16 are evacuated and degassed as by heating. The ion gauge 14 is similarly degassed and thereafter left in operation.

The valve 12 is now closed and the condenser-evaporator 18 cooled as by immersion in, for example, liquid nitrogen or liquid helium. The cryogenic system 55 of FIG. 1 may include a double-walled vacuum flask 65. For best results, the condenser-evaporator 18 should be completely immersed in the flask 65 to a level 58 shown in FIG. 1. If liquid helium were used, temperatures approximately 4° K. should be attainable at pressures of $10^{-11}$ mm. of Hg.

With the condenser-evaporator 18 immersed, the valve 12 is opened for a predetermined time and then closed and the finite sample of gas thus admitted is frozen on an inner surface of the condenser-evaporator 18. The immersion level is then lowered, as for example, to a level 66 as seen in FIG. 1 and power immediately applied to the heater windings 32 and 38. The temperature of the condenser-evaporator may thus be increased at a predetermined rate from near absolute zero. A rate of one degree C. per second was found satisfactory.

As the temperature increases, the various constituents in the sample are evaporated and the pressure of these vapors measured by the ion gauge 14, the output of which may be recorded as a function of time or temperature by suitable recorder means such as the recorder 52. With the cryopump 20, the vapors of each constituent are singly removed before subsequent vaporization of another constituent of higher condensation temperature. This is attainable by a proper choice of pump capacity and the rate at which the temperature is increased, unless two constituents have nearly identical characteristics.

It should be pointed out that a basic criterion of performance in the present invention is the degree of resolution obtainable between fractions having nearly equal vapor pressure-temperature characteristics. Any interference which may take place is minimized by evaporating all parts of the sample under uniform conditions. This requires that the sample be deposited as a layer of uniform thickness on the inner surface of the condenser-evaporator. By using a condenser-evaporator of spherical form, such a uniform deposit is obtained. Other geometrical forms, such as a cylinder, may be used but at the expense of lower resolution.

In cases of low pressure flow, it is known that the angular distribution of a gas issuing from a tube follows the cosine law. Expressed mathematically, the density in each elemental solid angle is therefore:

$$\frac{dm}{d\phi} = D_0 \cos \theta \tag{1}$$

In an elemental area at right angles to the flow, the density is known to vary inversely as the square of the distance "s" to the wall. Thus:

$$\frac{dm}{da} = \frac{D_0 \cos \theta}{s^2} \tag{2}$$

Since the deposit on the wall varies according to the inclination of the wall, again following the cosine law, the density of deposit on the wall will therefore be:

$$\frac{dm}{dA} = \frac{D_0 \cos^2 \theta}{s^2} \tag{3}$$

From the geometry of the circle, as seen in FIG. 1, $s = d \cos \theta$. Substituting this expression for the distance "s" in Equation 3 and simplifying:

$$\frac{dm}{dA} = \frac{D_0 \cos^2 \theta}{d^2 \cos^2 \theta} = \frac{D_0}{d^2} \tag{4}$$

The density of the deposit is therefore independent of the angle of flow into a spherically shaped condenser-evaporator and is in fact uniform over the entire surface area.

In the above equations the letter symbols are defined as follows:

$D_0$ = the density of the incoming gas along the axis of the delivery column 16

$d$ = the diameter of the spherically shaped condenser-evaporator 18

$\theta$ = a variable angle at which the gas molecules diverge from the axis of the delivery column 16 upon entering the condenser-evaporator 18

$s$ = the distance, dependent upon the angle of flow $\theta$, the gas molecules travel before impinging upon the wall of the condenser-evaporator 18

$\phi$ = a solid angle $\dfrac{dm}{d\phi}$ = the density $m$ per each elemental solid angle $\dfrac{dm}{da}$ = the density $m$ per an elemental area at right angles to the flow in the delivery column 16

$\dfrac{dm}{dA}$ = the density of the deposit on the wall (area) of the spherical condenser-evaporator 18

Thus, there has been described a thermal gas analyzer for quickly and accurately determining the constituents of a gas mixture. While only one embodiment of the invention has been shown and described, other modifications may be made and it is intended that the foregoing disclosure shall be considered only as illustrative of the principal of the invention and not construed in a limiting sense.

What is claimed is:

1. A gas analyzer comprising, in combination, valve means having an inlet connected to a source of gaseous mixture and an outlet; condenser-evaporator means coupled to said outlet and adapted to receive a predetermined amount of said mixture, said condenser-evaporator means including a spherical inner wall, cryogenic means for freezing said mixture uniformly along said wall, and heater means for increasing the temperature of said condenser-evaporator means at a predetermined rate from said near absolute zero temperature to vaporize the frozen mixture; recorder means operatively responsive to the pressure of the vapors of said mixture; and means including a cryopump coupled to said condenser-evaporator means to remove therefrom the vapors of said mixture substantially when vaporized.

2. A gas analyzer comprising, in combination, valve means having an inlet connected to a source of a gaseous mixture and an outlet; condenser-evaporator means coupled to said outlet and adapted to receive during a first time interval a predetermined amount of said mixture, said condenser-evaporator means including a spherical inner wall, cryogenic means for freezing said mixture uniformly on said wall, and heater means for increasing the temperature of said condenser-evaporator means at a predetermined rate from said near absolute zero temperature during a second time interval to vaporize the frozen mixture; recorder means operatively responsive to the vapor pressure of the components of said mixture; and means connected to said condenser-evaporator means for exhausting the vapors of said mixture into said source during said second time interval.

3. A gas analyzer comprising, in combination, valve means having an inlet connectable to a source of gaseous mixture and an outlet; condenser-evaporator means having a spherical inner wall; tubular means connected between said outlet and said condenser-evaporator means to provide a passageway for a predetermined amount of said mixture from said source; first heater means surrounding a portion of said tubular means adjacent said condenser-evaporator means; cryogenic means for lowering the temperatures of said condenser-evaporator means to substantially near absolute zero during a first time interval; second heater means associated with said condenser-evaporator means for selectively increasing the temperature thereof at a predetermined rate during a second time interval following said first time interval; recorder means operatively responsive to the pressure of the vapors of said mixture; and means including a cryopump coupled to said condenser-evaporator means for removing therefrom the vapors of said mixture during said second time interval.

4. A gas analyzer comprising, in combination, valve means having an inlet connectable to a source of gaseous mixture and an outlet; condenser-evaporator means having a spherical inner wall; tubular means connected between said outlet and said condenser-evaporator means to provide a passageway for a predetermined amount of said mixture from said source; first heater means surrounding a portion of said tubular means adjacent said condenser-evaporator means; cryogenic means for lowering the temperature of said condenser-evaporator means to substantially near absolute zero during a first time interval; second heater means associated with said condenser-evaporator means for selectively increasing the temperatures thereof at a predetermined rate during a second time interval following said first time interval; recorder means operatively responsive to the vapor pressure of the components of said mixture; and means connected to said condenser-evaporator means for exhausting the vapors of said mixture into said source through said tubular means during said second time interval.

5. A gas analyzer comprising, in combination, valve means having an outlet and an inlet connectable to a source of gaseous mixture; condenser-evaporator means having a spherical inner wall; delivery means including inner and outer coaxially disposed tubes, said inner tube extending from said outlet into said condenser-evaporator means to the inner wall thereof and said outer tube extending from said inner wall and forming a port near said valve means; first heater means including a winding surrounding the portion of said outer tube adjoining said condenser-evaporator means; cryogenic means including means for immersing said condenser-evaporator means to lower the temperature thereof to substantially near absolute zero during a first time interval to freeze said mixture uniformly on said wall; second heater means associated with said condenser-evaporator means for selectively increasing the temperatures thereof from said near absolute zero at a predetermined rate during a second time interval following said first time interval; recorder means including an ion gauge coupled to said port and operatively responsive to the pressure of the vapors of said mixture; and means including a cryopump coupled to said condenser-evaporator means for removing therefrom the vapors of said mixture during said second time interval.

6. A gas analyzer comprising, in combination, valve means having an outlet and an inlet connectable to a source of gaseous mixture; condenser-evaporator means having a spherical inner wall; delivery means including inner and outer coaxially disposed tubes, said inner tube extending from said outlet into said condenser-evaporator means to said inner wall and said outer tube extending from said inner wall and forming a port near said valve means; first heater means including a winding surrounding the portion of said outer tube adjoining said condenser-evaporator means; cryogenic means including means for immersing said condenser-evaporator means to lower the temperature thereof to substantially near absolute zero during a first time interval to freeze said mixture uniformly on said wall; second heater means associated with said condenser-evaporator means for selectively increasing the temperature thereof from said near absolute zero at a predetermined rate during a second time interval following said first time interval, the vapors of each constituent of said mixture being returned to said source via said inner tube during said second time interval; and recorder means including an ion gauge coupled to said port and operatively responsive to the pressure of the vapors received thereat via said outer tube.

References Cited by the Examiner

UNITED STATES PATENTS 2,413,565 12/46 Hewlett _____ 73—29
2,619,253 2/53 Deaton _____ 73—29

RICHARD C. QUEISSER, *Primary Examiner.*

JOSEPH P. STRIZAK, *Examiner.*